Nov. 6, 1962 L. MAIOCCHI 3,062,258
PNEUMATIC VEHICLE WHEEL TIRE
Filed March 17, 1959 2 Sheets-Sheet 1
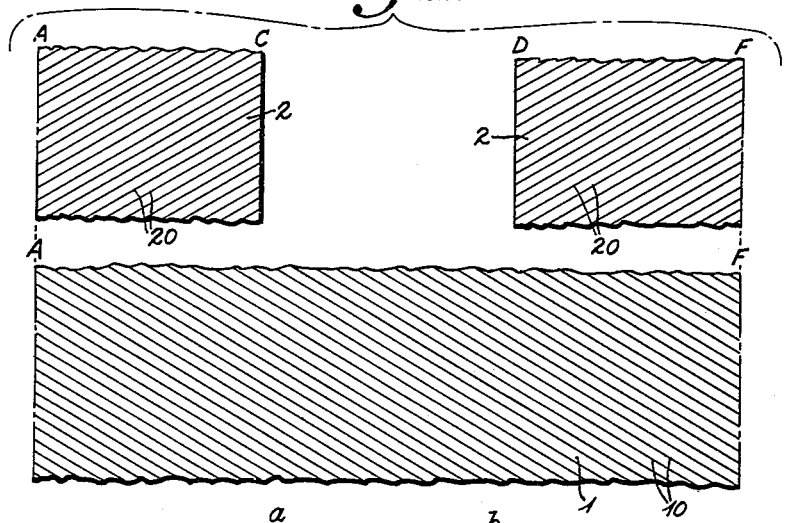
Fig.1.
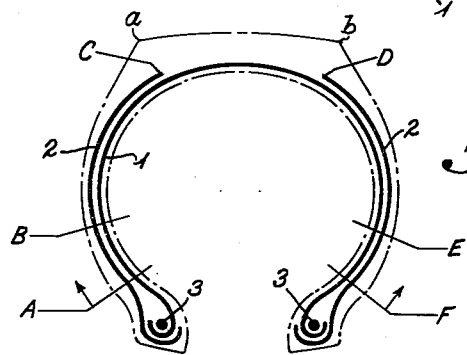
Fig.2.
Fig.3.
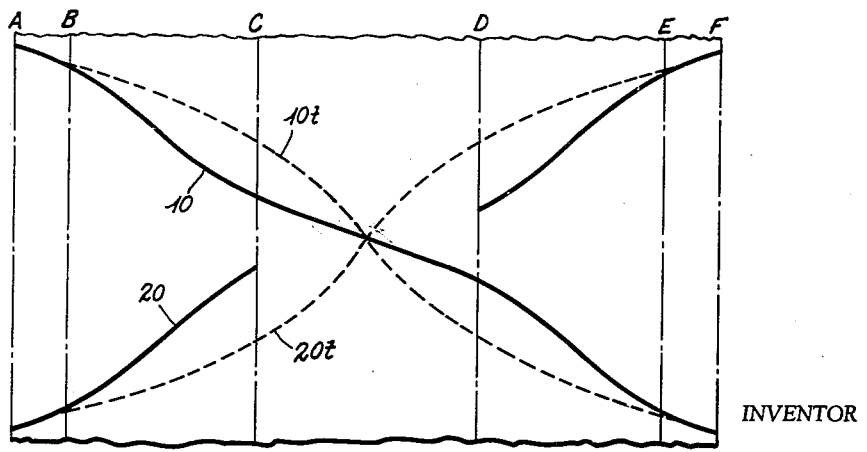
INVENTOR
Luigi Maiocchi
BY Stevens, Davis, Miller & Mosher
ATTORNEYS Nov. 6, 1962  L. MAIOCCHI  3,062,258
PNEUMATIC VEHICLE WHEEL TIRE
Filed March 17, 1959  2 Sheets-Sheet 2

INVENTOR
Luigi Maiocchi

BY *Stevens, Davis, Miller & Mosher*
ATTORNEYS

United States Patent Office 3,062,258
Patented Nov. 6, 1962

3,062,258
PNEUMATIC VEHICLE WHEEL TIRE
Luigi Maiocchi, Milan, Italy, assignor to
Pirelli S.p.A., Milan, Italy
Filed Mar. 17, 1959, Ser. No. 799,955
Claims priority, application Italy Apr. 3, 1958
7 Claims. (Cl. 152—356)

The present invention relates to pneumatic tires for vehicle wheels and more particularly concerns a tire having a typical structure of the carcass plies.

In the casing of the conventional tire, it is generally considered that the carcass is provided with a structure consisting of two or more layers of cord plies each formed of parallel cords bonded together by means of a layer of rubber compound, said plies being weftless or having, at the most, sheer weft threads for the purpose of holding the cords in place during the operations prior to rubberization.

The cord plies of these conventional tires are normally cut on the bias and disposed on the building drum in such a way that the cords of one ply may form, with respect to a plane normal to the axis of said drum, an angle equal and symmetrical to that of the cords of the adjacent ply or plies.

This bias cutting angle, corresponding to the angle formed by the cords of the plies situated on the building drum (with respect to a plane normal to the axis of the drum) generally ranges in value between 55° and 65° in the conventional tire.

During the tire building operation, because of the passage from the cylindrical to the toroidal shape, the angle of each cord, which is initially constant, assumes values varying from one point to the other, decreasing from the bead portion to the crown portion, said values being about 70° at the bead and about 40° at the crown. This variation in the angular disposition of the cords occurs as a result of the fact that the crossed cords of the superposed plies which are bonded to one another by means of a thin layer of a rubber compound are attached to one another throughout the movements occurring during the building and vulcanizing operations. In other words, in consequence of these operations, the cords of each layer are not disposed in the geometrical positions which they would freely assume in the absence of the effect of the adjacent contiguous layer of cords; thus it follows that the cords assume such geometrical positions that the tension stresses imparted to them are much greater than they would be if the cords were disposed in such a way as to be co-linear with the stresses acting upon them.

Pneumatic tire casings in which the carcass plies have a disposition other than the crossed disposition referred to above have already been studied for this purpose, as for example, pneumatic tire casings in which the carcass plies are constituted of radially disposed cords, namely, cords lying in planes passing through the rotational axis of the tire. Carcass structures of this type however have the inconvenience of being too easily deformed both in the vertical direction due to vehicle load and in the transverse direction due to centrifugal force when the vehicle is running on a curve. On the other hand, this radial type of carcass has achieved satisfactory results where reinforcement strips have been inserted between the carcass and the tread.

A further type of pneumatic tire which has also been studied is the one which is provided with the so-called "geodetical" carcass, namely, that carcass in which the cords can freely assume their own position, and in which the angles formed with respect to the parallels increase towards the crown portion, instead of decreasing as is the case with the conventional crossed structures.

The geodetical disposition of the carcass cords offers considerable advantages from the standpoint of the ratio between the resistance to stresses and the weight of the structure. However, at the same time, this geodetical disposition entails certain considerable disadvantages: in fact, a hypothetical geodetical structure involving a single layer with the course oriented in a single direction will result in a dissymmetry in the resistance of the tire, which would cause the rotation of one sidewall with respect to the other, thus producing a tire having little utility; on the other hand, a geodetical structure employing two layers having cords oriented in crossed directions (both geodetical) would require very complicated manufacturing equipment unsuitable for a standard production of any extensive nature.

The present invention has resulted in the discovery of a carcass structure which combines the advantages of the crossed carcass and of the geodetical carcass without having the corresponding disadvantages, and which can be constructed in a standard way with conventional equipment and with the conventional processes already employed for the production of so-called normal tire casings provided with crossed carcasses.

Therefore, a principal object of the present invention is to provide a pneumatic tire casing in which the carcass is characterized by a special structure of the plies based upon a new priniciple utilizing in particular the variation of the angles of the cords occurring during the shaping operation.

The structure of the tire carcass according to the present invention may be considered as being composed of two different parts: one part, having crossed cords, is situated in the sidewall portion of the tire including the bead portions thereof; the second part includes the central portion of the tire underlying the tread portion wherein the cords have a geodetical disposition along a single non-radial direction.

As illustrated by FIGURES 1–3, the carcass is composed of a ply cut on the bias at an angle equal to, or of the same order as, that of a normal crossed carcass which extends from one bead to the other; and of two strips, also cut on the bias, but whose cords will be crossed with respect to those of the first ply and which, starting from the bead, extend into the sidewall portions at least as far as the points representing the maximum width of the tire.

Preferably these strips extend beyond the sidewall portions into the portion below the tread, leaving between them an interspace which is generally not smaller than ⅓ of the tread width.

Instead of employing one ply and two strips, the same disposition can be obtained as illustrated in FIGURE 5, by employing a single ply 1 of greater width, cut on the bias and turned about both bead wires 3, with the edges extending into the sidewalls as indicated and constituting the two strips referred to above. Also, as shown in FIGURE 6, several plies such as plies 1 and 1' may be used in the same manner.

When several plies are to be employed, as illustrated in FIGURES 4 and 6 their cords must all be inclined at the same angle and in the same direction; likewise, all the strips 2', or turned edges, must have their cords all parallel to one another and inclined at an angle which is symmetrical to that of said plies.

Again, when using several plies, the strips, or the edges turned on the sidewalls, can have an equal or different width; in any event each strip, or turned edge, should be confined within the minimum and maximum limits indicated above; the strips, or turned edges, will preferably terminate in a graduated relationship.

It should be noted that the construction involving the combination of plies and strips makes it possible to obtain various different embodiments which can be quite useful for different purposes; for example the strips can be:

(a) Cut at an opposite angle different from that of the plies;

(b) Made of a material different from that of the plies;

(c) Made of cords having a different diameter and/or composition and/or having a different compactness with respect to those of the plies; and (d) Provided in a different number with respect to the plies.

As stated above, this carcass structure can be obtained during a normal tire building process although the carcass is characterized in that it has a crossed structure in the bead and sidewall portions only, and that the top central portion below the tread portion is formed by one or more layers of cords all inclined along a single direction.

When the carcass is subjected to the shaping operation, wherein the structure is changed from a cylindrical to a toroidal form, the angle formed by each cord of the continuous ply or plies with respect to any plane normal to the rotational axis, which angle is initially constant, will vary from one point in the tire to another in the manner indicated above.

In order to give a numerical indication of the values of the angles at the bead and at the top of the tire in a structure formed according to the present invention, it can be stated, by way of example, that a carcass of a passenger tire 165 x 400, in which the plies are cut on the bias at an angle of 60° and wherein the turned edges reach a position half-way between the portion of maximum width of the tire and the tread portion, have cords forming angles at the bead of about 70° and at the top of the tire of about 75°; this last value compares with an angle of about 40° in the conventional tire having the normally crossed plies.

It should be pointed out that this top angle depends upon the initial angle of the plies and the strips, the width of the strips, or turned edges, and the shaping ratio between the maximum diameter of the mould and the drum diameter; therefore, this top angle can be predetermined according to the functional characteristics of the tire which is being built.

Several tests carried out on tires constructed according to the present invention have proved that the disymmetry of the carcass structure in the central portion, which is caused by the fact that in this region all of the cords are inclined along a single direction, does not result in any inconveniences. It is assumed that this is due to the fact (a) that the high angle of the cords at the top portion results in a very small transversal component of the dissymmetrizing force and (b) that the dissymmetrical portion is, for the most part, situated below the tread which is formed by a thick layer of a compound having a relatively high hardness in contrast with the compound forming the remainder of the carcass.

Also in the pneumatic tire constructed according to the present invention, and as illustrated in FIGURE 5, one or more layers of conventional breakers, such as breaker layer 4, can be used. The layer or layers of the breaker can be disposed, in the conventional manner, with all of the cords inclined in the same direction or in a direction opposite to the cords of the underlying layers; also the angles formed by the cords can be equal to, or different from, those of the underlying cords.

It should be pointed out that, when the breaker is made of, or comprises at least one layer of cords inclined in the direction opposite to that of the cords of the underlying layers, the breaker structure must be applied after the carcass has been shaped; otherwise, the cords of the central portion of the carcass structure would be less free to take the geodetical path which constitutes one of the substantial features of the present invention.

When a breaker is not deemed necessary, a suitable expedient for improving the resistance and the life of the tire results in the employment of moulds wherein the ratio between the height and the chord of the cross section of the tire is considerably greater than one. In fact, as it is well known to those skilled in the art, a tire constructed of these dimensions, when inflated, decreases in diameter so as to place the tread rubber under compression.

It should be apparent that the carcass structure forming the object of the present invention as well as the process for producing the carcass structure permit the employment of all of the materials normally used in conventional tire construction; for example, natural, artificial or synthetic textile materials and metallic materials can be employed. Moreover, the material constituting the carcass cords can be different from that of the breaker cords, and the material constituting the plies of the carcass can be different from that of the strips, as set forth above.

In the foregoing description it has been set forth that the strips, or turned edges, are superimposed or external with respect to the plies; it should be obvious that the same result would be obtained if the strips, or turned edges, were lying below or inwardly with respect to the plies.

Other and further objects and advantageous features of the present invention will hereinafter more fully appear in connection with a detailed description of the drawings in which:

FIGURE 1 is a semi-diagrammatic and fragmentary plan view of the ply and the two strips which together form the carcass;

FIGURE 2 is a diagrammatic and transverse cross section of the tire formed from the ply and the strips shown in FIGURE 1;

Figure 4:
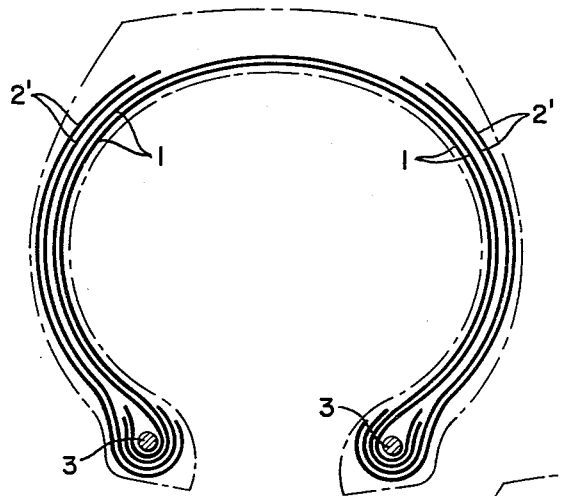
Figure 5:
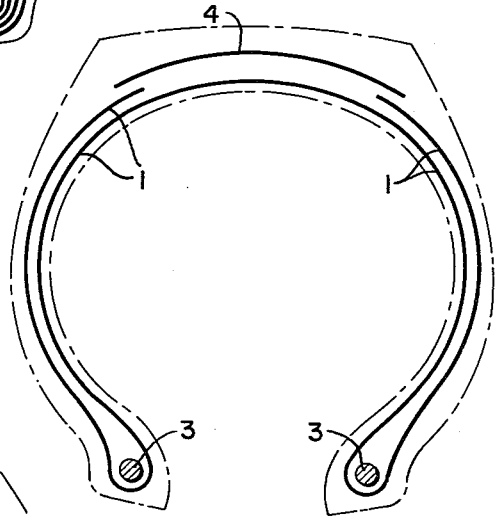
Figure 6:
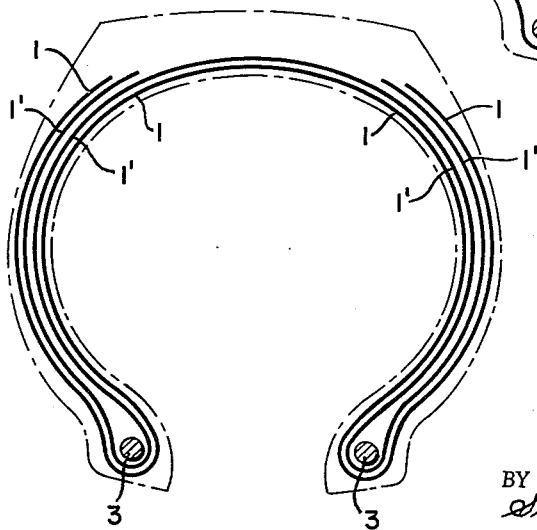

FIGURE 3 represents a developed diagrammatic view obtained by laying flat the portion of FIGURE 2 extending around the periphery of the tire between lines A and F; this figure shows, in full lines, the path of the ply cords and of the strips after the toroidal shaping and vulcanization of the tire casing; this figure also shows, in dotted lines, the path which the cords would assume if the carcass had been constructed in the conventional manner employing two plies having crossed paths, both plies extending across the entire width of the tire;

FIGURE 4 is a diagrammatic transverse cross section of the tire wherein two plies and two pairs of strips are utilized;

FIGURE 5 is a diagrammatic and transverse cross section of the tire, wherein a single ply, cut on a bias and turned about both bead wires is employed; and FIGURE 6 is a diagrammatic and transverse cross section of the tire, wherein two plies each turned about both bead wires are employed.

Referring to the drawings in detail, in FIGURE 1 there is shown a carcass ply 1 which extends for the full width of the tire and which, as shown in FIGURE 2, may be turned up about the bead wires 3. Reference numeral 2 indicates the strips which extend from the bead wires, around which they are also turned, beyond the portion of maximum width of the tire. As best shown in FIGURE 2, these strips 2 extend below the tread portion of the tire in such a manner as to leave a free portion between their terminal edges; this free portion has a width at least equal to ⅔ of the width a—b of the tread. Ply 1 has cords 10 which are inclined in a given direction. The strips 2 have cords 20 which have the same inclination but which are oriented in the opposite direction.

Passing from the cylindrical winding of the carcass ply and the strips on the drum to the toroidal shaping of the tire and to its subsequent vulcanization, the cords 10 and 20, as the present invention has ascertained, assume the path indicated in full lines in FIGURE 3; that is, in the lateral portions AB and EF respectively, the path of the cords is substantially the same as that obtained in the conventional crossed structure; on the other hand, in the central portion CD of the tire, the cords 10 have assumed a geodetical path since there was no interference from a superposed corresponding layer having an opposite inclined course. But, with respect to the central zone of the tire, the angles formed by the cords (with respect to the mid-circumferential plane of the tire) are greater than the angles which would be obtained had the tire been constructed in a conventional manner employing two plies for the full width of the tire. As shown in FIGURE 3, the cords 10*t* and 20*t* (shown in dotted lines) represent the paths which the cords would assume if the structure of the tire had been made in a conventional manner employing two plies crossed with respect to one another and extending for the full width of the tire; the cords 10*t* and 20*t* are consequently crossed also in the central portion CD.

In the intermediary portions BC and DE, the path of the cords 10 is still crossed with respect to the paths of cords 20 as in the case of portions AB and EF, but the sequence of the angle of the tangents at subsequent points changes so as to constitute a gradual passage of the disposition of cords 10 from those of the crossed structure to those of the portions having the geodetical structure.

Although the present invention has been described in particular relation to the drawings, it should be understood that other modifications apart from those shown or suggested herein may be made within the spirit and scope of this invention.

What is claimed is:

1. A pneumatic tire for vehicle wheels characterized in that the carcass of the tire consists of a central portion in which the cords of all the plies therein run along a single non-radial direction and have a geodetical disposition, and of two lateral portions, including the bead and sidewall portions, in which the cords form a substantially crossed structure.

2. A pneumatic tire as set forth in claim 1 characterized in that the carcass is composed of a single ply cut on the bias at an angle substantially the same as that of the plies of normally crossed carcasses, which single ply extends in geodetical disposition from one bead to the other, and of two strips, also cut on the bias and crossed with respect to said ply, which strips extend from the beads into the sidewall portions at least as far as the portion of maximum width of the tire.

3. A pneumatic tire as set forth in claim 2 characterized in that the two strips extend into the portion of the tire below the tread in such a way as to leave free under the tread a central portion having a width not smaller than ⅓ of the width of the tread measured at its upper edges.

4. A pneumatic tire as set forth in claim 2 characterized in that the single ply is replaced with a plurality of plies and the two strips are replaced with a plurality of strips, the cords of all plies being inclined at the same angle and in the same direction and the cords of all strips being parallel to one another and inclined at an angle symmetrical to that of the cords of the plies.

5. A pneumatic tire as set forth in claim 1 wherein a single ply, cut on the bias, is turned about the bead wires, the turned edges of said ply extending into the tire sidewalls, and constituting said two lateral portions.

6. A pneumatic tire as set forth in claim 5, characterized in that the single ply is replaced with several plies, the cord of all plies being inclined at the same angle and in the same direction.

7. A pneumatic tire as set forth in claim 6, wherein the turned edges terminate in a graduated relationship.

References Cited in the file of this patent

UNITED STATES PATENTS

| | | |
|---|---|---|
| 2,063,105 | King | Dec. 8, 1936 |
| 2,139,840 | McKone | Dec. 13, 1938 |
| 2,493,614 | Bourdon | Jan. 3, 1950 |
| 2,700,998 | Wallace | Feb. 1, 1955 |
| 2,703,128 | Darrow | Mar. 1, 1955 |
| 2,703,132 | Darrow | Mar. 1, 1955 |

FOREIGN PATENTS

| | | |
|---|---|---|
| 1,088,973 | France | Sept. 22, 1954 |